Nov. 29, 1927.  J. M. WILKINS  1,651,237
PRESSURE REGULATOR
Filed March 29, 1921    2 Sheets-Sheet 1
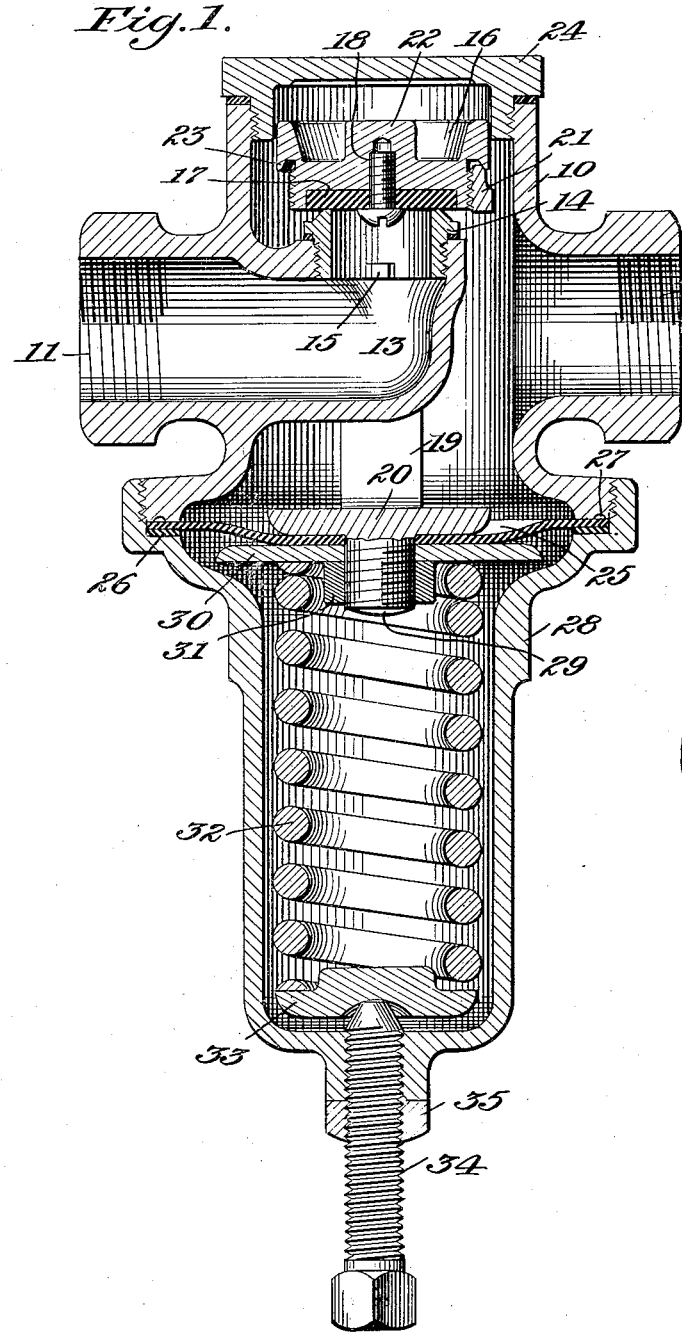
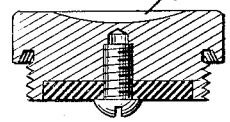
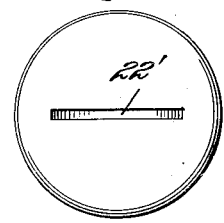
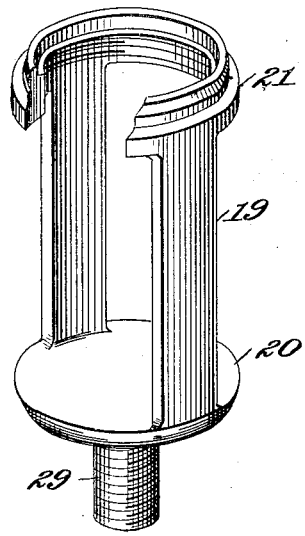
Inventor:
J. M. Wilkins

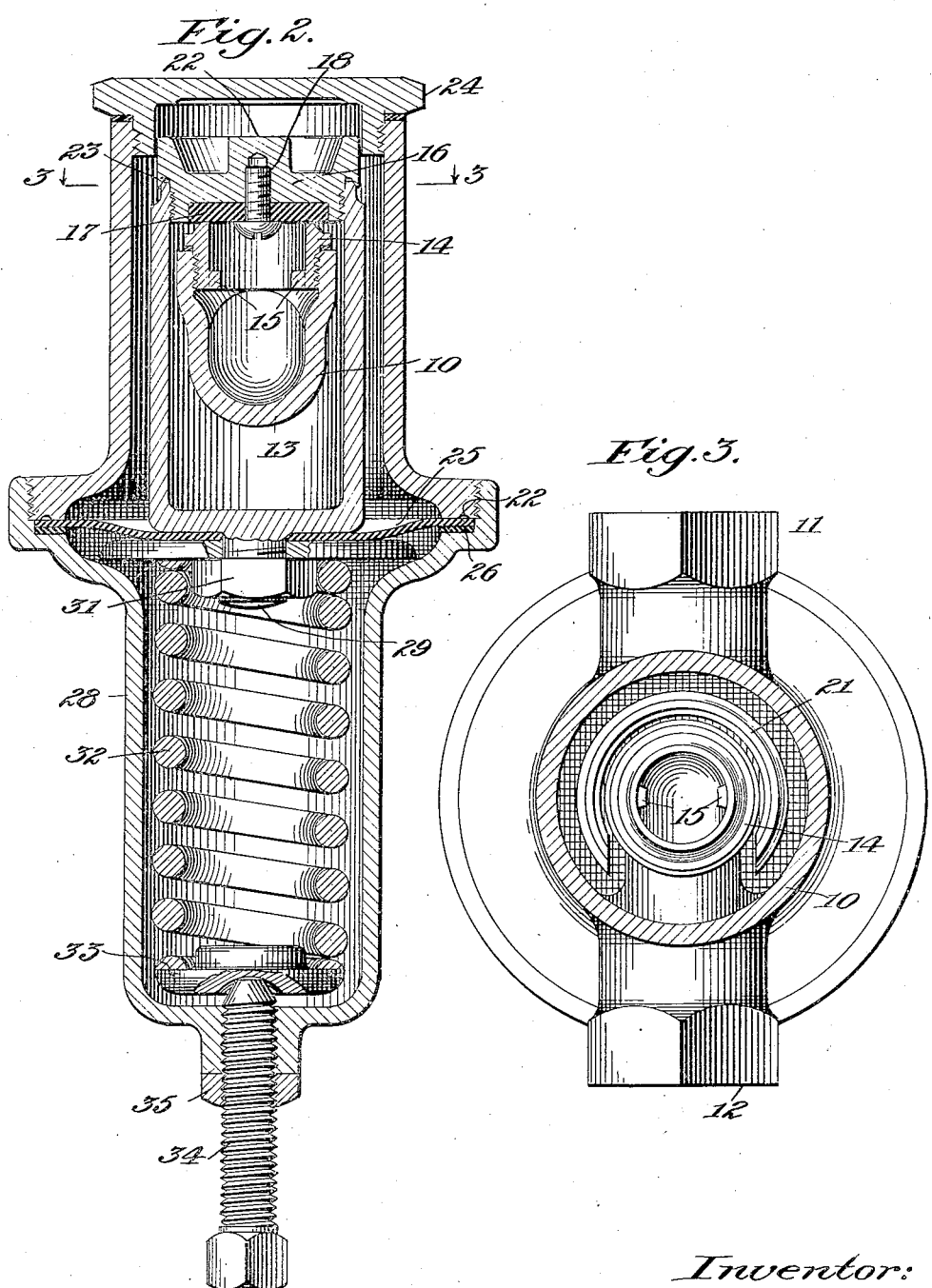

Patented Nov. 29, 1927.

1,651,237

UNITED STATES PATENT OFFICE.

JAMES M. WILKINS, OF DECATUR, ILLINOIS, ASSIGNOR TO ADOLPH MUELLER, TRUSTEE, OF DECATUR, ILLINOIS.

PRESSURE REGULATOR.

Application filed March 29, 1921. Serial No. 456,687.

The present invention relates to pressure regulators and, as here shown, is applied to water pressure regulators.

It has for its object to provide a pressure regulator in which the number of parts, of which the regulator is composed, are reduced to a minimum, so that cost of production is lessened and the assembling or disassembling of the regulator may be readily accomplished, and, furthermore, the arrangement is such that either the diaphragm side or the valve side of the regulator may be taken down for repair or replacement without the necessity of disturbing the other side and without the necessity of interfering with the line connection in which the regulator is set.

In order that the invention may be clear to those skilled in the art, there is shown in the accompanying drawings one physical embodiment of my invention and in said drawings—

Figure 1 is a vertical section view of a regulator made in accordance with this invention;

Figure 2 is a view in vertical section at right angles to Figure 1;

Figure 3 is a horizontal sectional view on substantially the line 3—3 of Figure 2 with the valve removed;

Figure 4 is a detail view of the yoke which couples the diaphragm and valve.

Figure 5 is a detailed sectional view of a different form of valve from that shown in Figures 1 and 2.

Figure 6 is a plan view of the valve shown in Figure 5.

Referring to the drawings by numbers, like numbers indicating like parts in the several views, 10 indicates the body portion of the regulator, having the straight open-ended chamber, from which lateral branches forming the inlet 11 and the outlet 12 extend, one of which branches, the inlet, as here shown, being provided with the nipple 13 projecting into the chamber of the body portion 10.

The said nipple is provided with a removable valve seat 14, preferably of the form shown, and threaded or otherwise suitably secured in the top of the nipple, with a suitably packed joint to guard against leakage; any suitable means, as spanner lugs 15, being provided to receive any suitable tool by which the removable valve seat 14 can be inserted or removed from the nipple aperture.

Seated upon the removable valve seat 14 is the valve 16, preferably recessed on its lower face to receive a suitable valve packing 17 which may be fastened in place in any suitable manner, as by the centrally disposed binding screw 18. The said valve 16 is carried by a yoke formed of the arms 19 rising from the base plate 20 and having at their upper ends the mutilated or cut-away ring member 21, the purpose of cutting away the ring member at a point between the arms 19 being, as will be clear from Fig. 3, to permit that ring member to straddle the nipple in assembling the parts and in the functioning of the valve. The valve 16 may be secured in any suitable manner to the ring member 21 of the yoke and, as here shown, is threaded thereto.

The valve 16 is preferably recessed as shown, and is provided with a central projection 22 which will be of angular formation to form a wrench or tool receiving projection by means of which it may be screwed into or unscrewed from the ring member 21 of the yoke. This recessing of the valve and locating of the projection in the recess is of some practical value, in that the wrenches or tools used to screw the valve in place or remove it are housed within the recess, and there is no likelihood in event of their slipping from the projection 22 of their striking and mutilating the cap receiving threads on the inside of the body portion 10 when the regulator is opened up for replacement or repair.

In the form of the valve shown in Figures 5 and 6, there is provided a slot 22' for a screw driver or similar tool, and this slot it will be observed is of considerable length so as to accommodate tools of different widths, and is deepest at its center so as to insure the tool being centered, the bottom of the slot curving uniformly to the center. The value of this slotting arrangement terminating short of the circumferential wall of the valve is that there is no danger of the screw driver or other tool raising a burr on that wall as would be the case if the slot 22' extended completely across the top of the valve and cut through at its ends the circumferential wall, which burr would be objectionable as it would score the wall of the cap 24 as the valve 16 slides up and down in the recess of said cap as hereinafter pointed out. If desired, means may be provided to overcome any tendency of the mutilated ring 21 to spread and release the valve, the means here shown being the provision of a recess in the valve having an overhang 23, which will engage the top edge of the ring 21 and hold it against lateral expansion when the valve is screwed home.

The body portion 10, above the valve, will be provided with a cap 24, preferably threaded and gasketed to the body so as to give a fluid tight joint, this cap 24 when removed, giving access to the valve side of the regulator for removal of the valve from its yoke or valve seat from its nipple for the purposes of repair and replacement, and it will be seen that the needs of the valve side may be cared for simply by removing the cap and without the necessity of disturbing any of the rest of the apparatus. The cap 24, it will be observed has a valve receiving recess on its underside and the valve 16 fits said recess with a sliding fit so that the vertical movements of the valve are guided and the valve will move to and from its seat without being tilted or affected by reason of the diaphragm 25 which supports the yoke and valve, and which being flexible is to a certain extent unstable.

The base plate 20 of the yoke seats upon the diaphragm 25 on the diaphragm side of the casing, this diaphragm having a washer 26, preferably on its underside, and bearing at its upper side against the under surface of the body portion 10, which is preferably grooved, as at 27, to give a tight non-leaking joint when the parts are assembled, the edge of the diaphragm being clamped between the body portion 10 and the spring housing 28 as shown. The base plate 20 preferably has a threaded lug 29, which passes through the diaphragm and through an abutment plate 30, a suitable nut 31 being provided to engage the threaded lug 29 and clamp the abutment plate against the diaphragm and hold it snugly to the base plate 20, as shown.

The housing 28 will be elongated for purposes of receiving the spring 32 which, at its upper end, bears against the abutment plate, and at its lower end engages the abutment disc 33, supported by the adjusting screw 34 threaded in the bottom of the housing 28, and having the lock nut 35.

It will be seen that if the diaphragm side needs repair or replacement it may be attended to by simply unscrewing the housing 28, and that the valve side or the pipe line in which the regulator is installed need not be disturbed for any repairs that are needed on the diaphragm side.

The construction lends itself very readily to assembling, for the valve seat having been mounted in the nipple, the yoke and diaphragm will be assembled, and placed in the body 10 in proper relation to the nipple, and the spring housing will then be coupled to the body 10, with the parts assembled in the housing as shown; after which, and from the valve side, the valve may be inserted in the yoke through the open top of the body 10, the cap 24 set up, and the diaphragm spring may then be adjusted to give the tension required for the pressure which is being handled.

The operation of the regulator will be obvious. The diaphragm spring having been set for the pressures to be handled, the opening and closing of the valve will be automatic and quickly responsive to changes in pressure. In the example shown, outlet pressure from 12 controls the valve, that outlet pressure being exerted on the diaphragm 25 to maintain the valve closed against the pressure of the diaphragm spring 32 until reduction in pressure on the outlet side permits the spring to move the diaphragm, yoke, and valve, whereupon inlet pressure from 11 will flow through the nipple until the pressure on the outlet side is again restored, and the valve will then automatically close.

Such departures from the construction here shown, as involve mere changes in design or the substitution of mechanical equivalents or expedients other than those herein set forth may, of course, be made without departing from the range of my invention.

I claim:

In a pressure regulator of the class described, the combination of a body portion having a relatively large, straight, open-ended chamber formed at one end to provide an extended diaphragm seating surface, inlet and outlet branches formed integrally with said body portion extending from said chamber, each having a fluid passage of substantial size, a nipple formed integrally with said body portion and in line with said inlet branch extending into said chamber, said nipple having a valve seat aperture of substantial size in its side wall directed toward an end of said chamber, a flanged valve seat having a raised valve receiving portion threaded into said aperture and provided with tool engaging means, a substantially U-shaped yoke straddling said nipple and having at one end an integral base portion with a lug thereon, and at its opposite end a non-continuous interiorly threaded ring, a diaphragm engaging said base portion and receiving said lug with its edge seated upon said diaphragm seating surface of said body portion, a disk-like seat-engaging valve member threaded to the interior wall of said yoke ring and accessible through one end of said chamber, a removable closure at said end of chamber having a depending flange threaded into the chamber, the interior of said flange closely receiving the circumference of said valve member to serve as a guide therefor in the movement of the valve member toward and from the valve seat, said valve member having on its upper surface, and spaced inwardly from its periphery, tool engaging means and provided with a depending flange overlying the upper and outer edge of said yoke ring when the valve member is threaded into position within the yoke ring, whereby to prevent expansion of the yoke ring, a housing detachably connected with the diaphragm end of said body portion and serving to clamp the diaphragm upon its seat, a diaphragm spring in said housing, said housing serving as a closure for the diaphragm end of said body portion.

In testimony whereof I have hereunto set my hand.

JAMES M. WILKINS.